No. 853,085. PATENTED MAY 7, 1907.
M. A. G. HIMALAYA.
PROCESS OF MAKING SMOKELESS POWDER.
APPLICATION FILED FEB. 16, 1906.

WITNESSES:
Jos. A. Ryan.
Edw. W. Byrn.

INVENTOR
Manuel Antonio Gomes Himalaya
BY Munn & Co.
ATTORNEYS

UNITED STATES PATENT OFFICE.

MANUEL ANTONIO GOMES HIMALAYA, OF WASHINGTON, DISTRICT OF COLUMBIA.

PROCESS OF MAKING SMOKELESS POWDER.

No. 853,085.　　Specification of Letters Patent.　　Patented May 7, 1907.

Application filed February 16, 1906. Serial No. 301,524.

*To all whom it may concern:*

Be it known that I, MANUEL ANTONIO GOMES HIMALAYA, a subject of the King of Portugal, at present residing in the city of Washington, in the District of Columbia, United States of America, have invented a new and useful Process of Making Smokeless Powder, of which the following is a specification.

My invention relates to an explosive, composed of chlorate of potash, starch and a siccative oil.

It is well known that chlorate of potash has been recognized, since its discovery by Bertollet in 1786, as a powerful oxidizing compound, suitable to form the basis of most valuable explosives. Nevertheless all experiments attempting to produce a safe and practical explosive on the basis of chlorate of potash, have been unsuccessful, and at many times disastrous. The reason for this failure is, that chlorate of potash as ordinarily combined, liberates its oxygen too quickly and produces very dangerous explosives when mixed with amorphous carbon, sulfur, starch, sugar and other combustibles. And as such mixtures are as dangerous as dynamite without being as quick, chlorate of potash explosives have not been generally used in ordinary practical engineering, sporting and military works.

My invention consists in a novel process in which chlorate of potash in an impalpable powder is incorporated in the grains of starch without gelatinizing or destroying the structural grains of the starch as will be hereinafter more fully described.

Figure 1:
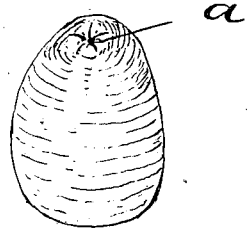
Figure 2:
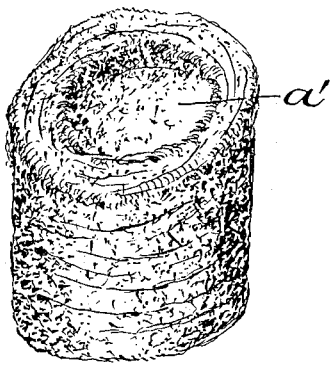

Figure 1 of the drawing is a magnified view of a grain of starch in its normal condition, and Fig. 2 is a similar view of a grain of starch as treated in carrying out my invention.

These views will aid in the illustration of one of the distinctions of my invention, as hereafter described.

In carrying out my invention I combine intimately, in the proportions and conditions below described, the three following compounds: (*a*) chlorate of potash reduced to impalpable powder; (*b*) starch or other amylaceous matter or related organic compounds having the property of inflating or puffing up in contact with hot water, and (*c*) a siccative oil, such as poppy-seed oil, walnut oil, or any similar oil extracted from hickory-nuts, beech-nuts, pine-nuts, linseed, or from any seed, branch, bark, sap or wood of coniferous plants, juglandaceæ, or any other plants.

My process of mixing intimately together these three compounds—chlorate of potash, starch and siccative oil, is as follows: The chlorate of potash, reduced to impalpable powder, is placed in a relatively small volume of preferably hot water, sufficient to make a thick batter, that is to say, about three parts by weight of the salt to one part or less of water. It is then placed in a double boiler, or in a boiler warmed by steam or any other moderate source of heat. The chlorate of potash is sufficiently in excess that only a very small portion of the same is in solution, the bulk of it being a semi-solid plastic mass. At the same time the starch is mixed with a convenient quantity of warm water, *i. e.* about a little less than its weight, and whose temperature should not attain 70° C. This makes a cream-like batter. The two compounds, chlorate of potash and starch are then mixed together, and the temperature of this mixture is rapidly raised to about 80° C. This mixture is continuously agitated in order to bring the chlorate of potash and starch in intimate contact and avoid the crystallization of the chlorate impalpable powder. When the temperature of the mixture attains from 70° to 80° C. more or less, the starch grains commence to inflate or puff up, absorbing much of the water present and causing the hilum or central cavity of the starch grain to become enlarged, but without gelatinizing or destroying the structural character of the grain.

Just here I may describe the important and distinctive feature of my process. Chlorate of potash and starch in the form of wheat flour, have heretofore been combined with linseed oil, but without the heat and moisture necessary to secure the swelling and enlargement of the hilum of the starch grain. Moreover wheat flour contains nitrogen which is an objectionable element since it forms nitrogen compounds in burning. On the other hand, a boiling solution of chlorate of potash has been combined with starch, as in British Patent No.

14,379 of 1884, the amount of water present being sufficiently in excess to completely gelatinize the starch and destroy its granular structure, involving great difficulties in drying and also forming a different physical composition in which impregnation of the chlorate of potash is by solution instead of mechanical mixture. In my process, only a very small proportion of water is present, only sufficient to promote admixture, and when the temperature is raised to about 80° C., the swelling and opening of the hilum of the starch grain occurs. This not only absorbs much of the water present, (thus facilitating the subsequent drying), but the starch grains are not gelatinized or structurally destroyed, but are merely expanded to open the hilum, and thus suck into the same the particles of chlorate of potash to form an intimate mechanical association between both the interior and exterior of the grain. That this may be better understood, I have shown in Fig. 1 on a greatly enlarged scale, a grain of raw starch, whose hilum $a$ is closed, and in Fig. 2 I have shown the same grain after, by heat and moisture, its hilum has become expanded and enlarged as shown at $a'$ and more or less filled with particles of chlorate of potash. It will be seen from the foregoing that I have introduced mechanically the chlorate of potash particles to the interior of the starch grain as well as its exterior. After the chlorate of potash and starch have thus been incorporated, the siccative oil, preferably linseed oil, boiled with litharge or with manganese salts, to increase its siccative properties, is poured over the batter formed by the chlorate of potash and starch, and is intimately mixed with these substances. This mixture produces a kind of thick paste-like dough, having uniform composition and mechanical consistence. This paste is immediately taken from the source of heat, and is preferably spread on a smooth surface in order to produce a first partial oxidation of the siccative oil in contact with the air. This paste is continuously worked over and mixed to avoid the formation of sensibly large crystals of chlorate of potash and to promote the first partial oxidation of the siccative oil and to partially dry and harden the paste formed of chlorate of potash, starch and siccative oil. The operation is conducted very rapidly, and a warm, dry current of air could advantageously be employed to expedite the operation. The paste is then immediately thrown into a suitable pressing apparatus and forced through more or less fine holes by means of compressed air, a piston, or any suitable devices, or is reduced to any other desired shape.

The vermicelli-like strips obtained are shaken out continuously and distributed in a thin coat over suitable trays. These trays are exposed to the sun's rays, or simply placed in any more or less warm and ventilated place. A few hours or days afterward, according to the temperature, ventilation, etc., of the place, the vermicelli-like strips are quite dried, the siccative oil is sufficiently oxidized to consolidate and to make the product water proof, and the explosive is ready for use. The relative proportions of chlorate of potash, starch and siccative oil, may change widely according to requirements. If a smokeless explosive is needed, the quantity of chlorate of potash varies from 75% more or less to about 85%, and the proportion of starch, or other amylaceous matter, varies then from 19% to 8%, and the proportion of siccative oil is preferably 6%, but may vary from a fraction of 1% to about 10%.

If a semi-smokeless powder is desired, as is convenient in war operations for bursting shells, in order to see the place where they fall and to be able to rectify the pointing of the guns; or if an impure explosive is sufficient for economical or other reasons, the quantity of chlorate of potash can be from 75% down to less than 50%, and the relative proportion of the starch base can be increased from 19% up to more than 45%, and the percentage of siccative oil may vary from less than 1% to more than 10%. Of course when the quantity of siccative oil becomes very small, the mechanical inclosure of the chlorate of potash becomes very precarious, and the explosive is not very safe nor sufficiently water-proof, but such product can be employed for immediate purposes where safety is not required. Pushing the tolerance to the limits, which very seldom should be allowed, the siccative oil can be entirely omitted and the chlorate of potash can be combined with the starch in the conditions above described, that is to say, the pulverized chlorate of potash and the starch in the proportions of preferably 75% to 85% of chlorate of potash and 25% down to 15% of starch could be mixed without the siccative oil, and such batter can be warmed to from 70° C. to 80° C., or more if desired. Such an explosive, however, is dangerous and it is not water-proof. Therefore its use is to be avoided.

Any siccative oil forms a practical, economical and efficacious substance to complete the inclosure of the chlorate of potash, since the microscopic pellicle, which siccative oil forms around the particles of chlorate of potash and the inflated starch, affords a kind of elastic, cellular texture or network, accomplishing all the requirements for a safe water-proof explosive.

The reason why the explosive containing siccative oil is water-proof, is because the inclosing pellicles of the siccative oil, after complete oxidation, offer a great resistance to the action of water, which water would have a tendency to dissolve the paste formed of chlorate of potash and inflated or puffed up starch. Moreover, the presence of such network of oxidized siccative oil renders the explosive safe. It is known that when the particles of chlorate of potash are violently struck with a hammer against a hard surface in presence of a non-elastic combustible substance, the atoms of oxygen existing in the chlorate of potash are forced into union with the combustible substance and deflagration occurs. But if the particles of chlorate of potash are coated with a film or sac of elastic substance, such as that produced by the siccative oil after oxidation, such film acts as a cushion, and it is necessary to pulverize very completely the grains of the explosive and destroy the net-work formed by the inflated starch and oxidized oil to produce deflagration. For this reason this explosive is remarkably safe. It is important to state that other non-siccative oils, such as olive oil, fish oil, etc., are not available to produce this result. Even the solid oils, such as cocoa oils, etc., or common non-siccative oils, coagulated or transformed in solid isomeres by the protoxid of the nitrogen vapors are not quite practical; because they are not able to form a resistant cellular texture or net-work as above referred to. Nevertheless, in special cases, where an inferior grade of explosive is admitted, such oils and similar products as stearin, spermaceti, wax of every kind, etc. may be employed.

Hydrocarbons, such as vaseline, paraffin, and, in a general way, kerosene or coal oil, etc., are not advantageous for the purpose of inclosing the particles of chlorate of potash for the following reasons: In the first place, they are not siccative compounds, and could not accomplish the same purpose of siccative oils. In the second place, the composition of the hydrocarbons is unsuitable for the purpose of making a good combustible cell around the particles of chlorate of potash and starch. In fact, it is well known that hydrocarbons are CH. compounds, more or less saturated. And siccative oils, and even non-siccative oils are CHO compounds, belonging to another class of organic compounds which is far more distant from the family of hydrocarbons than from the related families of alcohols, ethers, aldehydes, glucoses, etc.

Hydrocarbons do not contain oxygen, a most needed element for the oxidation of the carbon and hydrogen, essential elements of this explosive. Therefore, if hydrocarbons were employed instead of siccative oils, which are very rich in oxygen, it would be necessary to put a greater proportion of chlorate of potash to furnish all the required oxygen for a perfect combustion; otherwise, the explosion would produce great quantities of CO, (carbon monoxid) which is a poisonous gas and represents a loss of energy. Hence, hydrocarbons should always be avoided in the preparation of this explosive.

In carrying out my process, I do not confine myself to the precise order of steps, proportions, or ingredients described as preferable, as many variations may be made within the scope of my invention as defined in my claims. Thus, for instance, the chlorate of potash and starch may be mixed together in a single receiver with the required quantity of water. Also, the siccative oil may be applied to any one of the ingredients, or to all of them contemporaneously. In all cases, however, the starch grains are acted upon by heat and moisture to cause expansion of the starch grain and enlargement of the central cavity with absorption of water and intimate impregnation of both the interior and exterior of the starch grains with the particles of chlorate of potash, the structural integrity of the starch grain not being destroyed. I may also, to increase the force or quickness of the powder, add to the composition described, other stimulating ingredient or ingredients, such as binoxid of manganese (which makes a black powder), or protoxid of copper, or binoxid of barium, the same being incorporated with the paste while in process of fabrication. The proportion of these stimulants should be very small, $i.\ e.$ from $\frac{1}{5000}$ to $\frac{5}{100}$ parts of the total weight of the paste. So also, for the same purpose, a quantity of nitro-glycerin, xyloidin or pyroxylin, gun cotton powder, and picrate compounds may be added in varying proportions as may be found desirable. Furthermore, instead of chlorate of potash, I may use chlorate of soda, or even nitrate of potash or nitrate of soda, or other oxygen furnishing substance or any combination of the same.

Having thus described my invention, what I claim as new and desire to secure by Letters Patent is:

1. The process of making explosives, which consists in forming a batter of an oxygen furnishing ingredient mixed with about one third its weight of water, forming a second batter of starch and water in approximately equal parts by weight, thoroughly mixing these batters and raising the temperature to about 80° C., working into the mass a siccative oil, then pressing into ultimate form and drying.

2. The process of making explosives, which consists in forming a batter of chlorate of potash mixed with about one third its weight of water, forming a second batter of starch and water in approximately equal parts by weight, thoroughly mixing these batters and raising the temperature to about 80° C., working into the mass a siccative oil, then pressing into ultimate form and drying.

3. The process of making explosives, which consists in forming a batter of chlorate of potash mixed with about one third its weight of water, forming a second batter of starch and water in approximately equal parts by weight, mixing the two batters and adding thereto a second oxygen furnishing ingredient, raising the temperature to about 80° C., working into the mass a siccative oil, then pressing into ultimate form and drying.

4. The process of making explosives, which consists in forming a batter of chlorate of potash mixed with about one third its weight of water, forming a second batter of starch and water in approximately equal parts by weight, mixing the two batters and adding thereto binoxid of manganese, raising the temperature to about 80° C., working into the mass a siccative oil, then pressing into ultimate form and drying.

MANUEL ANTONIO GOMES HIMALAYA.

Witnesses:
EDW. W. BYRN,
SOLON C. KEMON.